United States Patent
Chen et al.

(10) Patent No.: US 9,066,073 B2
(45) Date of Patent: Jun. 23, 2015

(54) ERROR RESILIENT RATE DISTORTION OPTIMIZATION FOR IMAGE AND VIDEO ENCODING

(75) Inventors: Zhifeng Chen, San Diego, CA (US); Peshala V. Pahalawatta, Glendale, CA (US); Alexandros Tourapis, Milpitas, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 264 days.

(21) Appl. No.: 13/880,370

(22) PCT Filed: Oct. 19, 2011

(86) PCT No.: PCT/US2011/056835
§ 371 (c)(1),
(2), (4) Date: Apr. 18, 2013

(87) PCT Pub. No.: WO2012/054570
PCT Pub. Date: Apr. 26, 2012

(65) Prior Publication Data
US 2013/0223513 A1    Aug. 29, 2013

Related U.S. Application Data

(60) Provisional application No. 61/405,025, filed on Oct. 20, 2010.

(51) Int. Cl.
| | | |
|---|---|---|
| H04N 11/02 | (2006.01) |
| H04N 19/154 | (2014.01) |
| H04N 19/147 | (2014.01) |
| H04N 19/61 | (2014.01) |
| H04N 19/103 | (2014.01) |

(Continued)

(52) U.S. Cl.
CPC ........... *H04N 19/002* (2013.01); *H04N 19/147* (2014.11); *H04N 19/61* (2014.11); *H04N 19/103* (2014.11); *H04N 19/154* (2014.11); *H04N 19/523* (2014.11); *H04N 19/895* (2014.11)

(58) Field of Classification Search
CPC ...................................... H04N 19/002
USPC ........................................ 375/240.01–240.29
See application file for complete search history.

(56) References Cited

U.S. PATENT DOCUMENTS

| | | |
|---|---|---|
| 5,144,688 A | 9/1992 | Bovir |
| 6,975,755 B1 | 12/2005 | Baumber |
| 2004/0076332 A1* | 4/2004 | Lin et al. ...................... 382/236 |

(Continued)

FOREIGN PATENT DOCUMENTS

| | | |
|---|---|---|
| WO | 2004/100556 | 11/2004 |
| WO | 2008/076148 | 6/2008 |

OTHER PUBLICATIONS

Stockhammer, T. et al. "H.264/AVC in Wireless Environments", IEEE Trans. on Circuits and Systems for Video Technology, vol. 13, No. 7, pp. 657-673, Jul. 2003.

(Continued)

*Primary Examiner* — Dave Czekaj
*Assistant Examiner* — Leron Beck

(57) ABSTRACT

Error resilient rate distortion optimization (ERRDO) is used for transmitting high quality images and video over constrained bandwidth networks, e.g., in streaming applications. Transmitting high quality images and video by reducing computational complexity is described.

15 Claims, 3 Drawing Sheets

(51) Int. Cl.
*H04N 19/523* (2014.01)
*H04N 19/895* (2014.01)

(56) References Cited

U.S. PATENT DOCUMENTS

| | | | |
|---|---|---|---|
| 2005/0175090 A1* | 8/2005 | Vetro et al. | 375/240.03 |
| 2006/0098738 A1 | 5/2006 | Cosman | |
| 2006/0188020 A1 | 8/2006 | Wang | |
| 2006/0197686 A1 | 9/2006 | Liu | |
| 2006/0256867 A1* | 11/2006 | Turaga et al. | 375/240.16 |
| 2007/0140338 A1 | 6/2007 | Bhaskaran | |
| 2007/0248268 A1 | 10/2007 | Wood | |
| 2009/0031191 A1 | 1/2009 | Yang | |
| 2009/0067495 A1 | 3/2009 | Au | |
| 2009/0180711 A1 | 7/2009 | Lavin | |
| 2010/0002770 A1 | 1/2010 | Motta | |
| 2010/0067574 A1 | 3/2010 | Knicker | |
| 2010/0111182 A1 | 5/2010 | Karczewicz | |
| 2010/0278275 A1* | 11/2010 | Yang et al. | 375/240.27 |

OTHER PUBLICATIONS

Stockhammer, T. et al. "Optimized Transmission of H.26L/JVT Coded Video Over Packet-Lossy Networks", Proc. of the International Conference on Image Processing (ICIP), 2002.

Zhang, R. et al. "Video Coding with Optimal Intra/Inter-Mode Switching for Packet Loss Resilience", IEEE Journal on Selected Areas in Communications, vol. 18, No. 6, pp. 966-976, Jun. 2000.

Yang, H. et al. "Advances in Recursive Per-Pixel End-to-End Distortion Estimation for Robust Video Coding in H.264/AVC", IEEE Trans. on Circuits and Systems for Video Technology, vol. 17, No. 7, pp. 845-856, Jul. 2007.

Leontaris, A. et al. "Video Compression for Lossy Packet Networks with Mode Switching and a Dual-Frame Buffer", IEEE Trans. on Image Processing, vol. 13, No. 7, pp. 885-897, Jul. 2004.

Chen, Z. et al. "Study of Video Distortion for Real-Time Video Transmission Over Wireless Channels", Proceedings of SPIE Defense & Security Symposium 2009, Orlando, FL. USA, Apr. 13-17, 2009.

T-REC-H.264, "Advanced Video Coding for Generic Audiovisual Services" Mar. 2009.

Chen, Z. et al. "Prediction of Transmission Distortion for Wireless Video Communication: Algorithm and Application", Journal of Visual Communication and Image Representation, Academic Press, Inc. US, vol. 21, No. 8, Sep. 17, 2010, pp. 948-964.

Fumagalli, M. et al. "Expected Distortion of DCT-Coefficients in Video Streaming Over Unreliable Channel", Jan. 1, 2006, Visual Content Processing and Representation Lecture Notes in Computer Science, pp. 1-8.

Gong, Yun, "Rate-Distortion-Based Mode Selection for H.264/AVC in Wireless Environments" Proc. SPIE vol. 5600, Multimedia Systems and Applications VII, 63, Oct. 25, 2004.

Heng, Brian A. "End-to-End Rate-Distortion Optimized MD Mode Selection for Multiple Description Video Coding" EURASIP Journal on Applied Signal Processing, vol. 2006, pp. 1-12, 2006.

Zhang, Y. et al. "Optimum End-to-End Distortion Estimation for Error Resilient Video Coding" pp. 513-520, 2004.

Zhang, Y. et al. "Error Resilience Video Coding in H.264 Encoder with Potential Distortion Tracking" 2004 IEEE, pp. 163-166.

Zhang, Y. et al. "Joint Source-Channel Rate-Distortion Optimization for H.264 Video Coding Over Error-Prone Networks" IEEE Transactions on Multimedia, vol. 9, No. 3, Apr. 2007, pp. 445-453.

\* cited by examiner

ERROR RESILIENT RATE DISTORTION OPTIMIZATION FOR IMAGE AND VIDEO ENCODING

CROSS-REFERENCE TO RELATED APPLICATIONS

This application claims priority to U.S. Provisional Patent Application No. 61/405,025 filed 20 Oct. 2010, hereby incorporated by reference in its entirety.

TECHNOLOGY

Embodiments of the present invention relate generally to encoding image and video data. More specifically, embodiments of the present invention relate to error resilient rate distortion optimization for image and video encoding.

BACKGROUND

Image and video streaming applications have increased in popularity in recent years. These applications can range from software and devices that enable on-demand streaming of content to a user, to peer-to-peer video streaming, to on-line video broadcasts, as well as to image and video sharing within a user's home network. These applications may require transmission of images and video over wired as well as wireless networks. For example, proliferation of mobile multimedia devices such as smart phones that can record and playback image and video data has led to an increased interest in technologies that enable high quality wireless image and video transmission as well as in technologies that enable seamless connectivity between such devices and other interconnected multimedia devices. New developments in video such as an emergence of 3D stereoscopic and multi-view video as well as high dynamic range imaging and video will also add to a need for high quality image and video transmission while further increasing the bandwidth requirements. Therefore, the ability to provide high quality images and video over constrained bandwidth networks is a major factor for all such streaming applications.

Two factors, however, can affect the ability to stream high quality image and video data. They are bandwidth limitations and random unpredictable losses in the channel.

BRIEF DESCRIPTION OF THE DRAWINGS

The accompanying drawings, which are incorporated into and constitute a part of this specification, illustrate one or more embodiments of the present disclosure and, together with the description of example embodiments, serve to explain the principles and implementations of the disclosure.

DESCRIPTION OF EXAMPLE EMBODIMENTS

Figure 1:
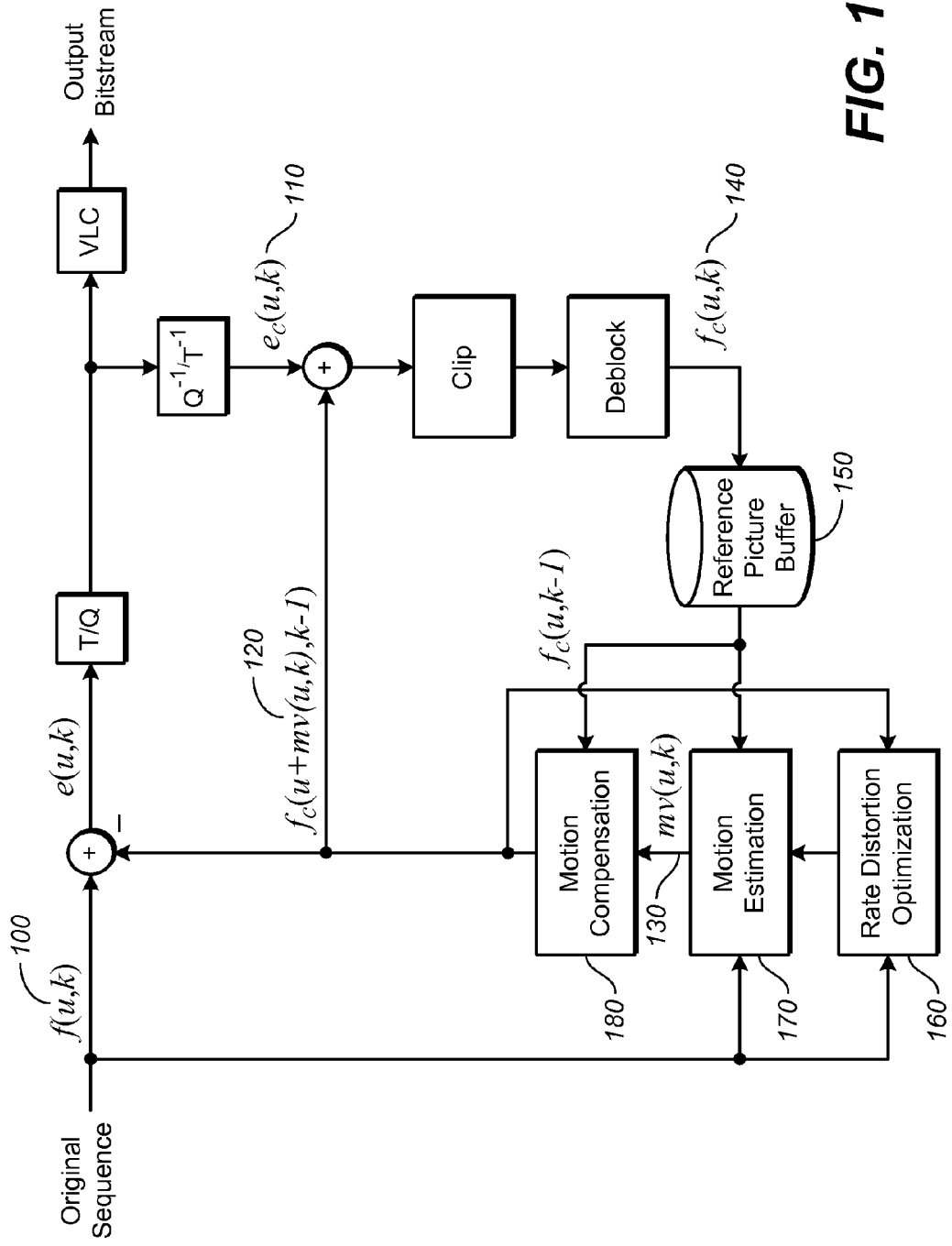
FIG. 1 shows a block diagram of a video encoder with a rate distortion optimization block.

According to a first aspect of the present disclosure, a method for distortion optimization of image or video data is provided, comprising: providing a coded image or video data; evaluating distortion of the coded image or video data as a function of transmission distortion of the image or video data; and performing distortion optimization of the image or video data while encoding the image or video data.

According to a second aspect of the present disclosure, an encoder adapted to receive an image or video data is provided, the encoder comprising: an input for receiving the image or video data; a reference picture buffer unit, the reference picture buffer unit containing stored image or video data; a rate distortion optimization unit, the rate distortion optimization unit adapted to receive the image or video data from the input; a motion estimation unit, the motion estimation unit adapted to receive the image or video data from the input and the rate distortion optimization unit, and adapted to receive stored image or video data from the reference picture buffer unit; a motion compensation unit, the motion compensation unit adapted to receive the image or video data from the motion estimation unit and the stored image or video data from the reference picture buffer unit; a transforming unit; and a quantizing unit, the quantizing unit and the transforming unit adapted to receive a combined image or video data from the input and the motion compensation unit.

Error resilient rate distortion optimization (ERRDO) is one method that can be used to alleviate effects of bandwidth limitations and random unpredictable losses in a channel. Rate distortion optimization is used in video compression to minimize an estimate of a video distortion subject to a constraint on bitrate. Typically, this is performed through a careful selection of motion vectors, macroblock modes, reference pictures, etc., to reduce redundancy that may exist in a bitstream such that it will fit within prescribed constraints. Less redundancy in the bitstream, however, though relevant for compression efficiency, also reduces its resilience to unpredictable errors.

Video compression techniques include some techniques for improving error resilience such as FMO (Flexible Macroblock Ordering), ASO (Arbitrary Slice Ordering), and redundant slices. However, these have been of limited practical use due to high implementation complexity, both in a video encoder and in a decoder.

A less complex approach for increasing error resilience is that of random intra refreshing (e.g., randomly inserting intra coded pictures or intra macroblocks in the bitstream) [see reference 1]. This reduces dependency of new pictures/macroblocks on previously decoded pictures/macroblocks, and thereby reduces error propagation in a decoded video. However, additional bits used for intra coded macroblocks increase bandwidth and as a result also increase the bitstream's susceptibility to errors.

Other schemes choose regions of an image or video that are most likely to be adversely affected by errors, and selectively insert intra coded blocks in only those regions. In addition to a choice of intra coded blocks, other mode decisions, such as a choice of reference picture (including use of long term reference pictures), that are typically performed during rate distortion optimization can also be modified to consider an effect of channel losses, thereby improving error resilience of the bitstream while still remaining within a constrained bandwidth. In addition, unequal error protection may also be provided to source data packets containing more important information, such as in the case of scalable video coding where, for decoding, one layer may depend on a previously decoded, and therefore more important, layer. Therefore, an error resilient rate distortion optimization can be formulated as:

$$\min_s J(s) = E[D(s, c)] + \lambda R(s), \quad (1)$$

where s denotes a selected mode (herein also referred to as source parameters) in accordance with the above paragraph, c denotes channel conditions, E[D(s,c)] denotes expected distortion given the selected source parameters and the current channel conditions, and R(s) denotes a bitrate given the selected source parameters. The term "selected mode" (source parameters) refers to a method used for encoding (such as choice of intra coded blocks, block size/shape, choice of reference picture) and the term "channel conditions" refers to quality of a medium (such as packet or bit error rate) in which the bitstream traverses from an encoder to a decoder. The bitrate R(s) may either be obtained as a true bitrate of encoding source data, which can increase a complexity of a mode decision process, or as an estimated bitrate.

A difference between equation (1) and a conventional rate distortion optimization (RDO) scheme is a computation or estimation of an expected distortion given the source parameters and channel conditions. This difference is due to the estimate of the distortion no longer being deterministic but instead depending also on random losses during transmission.

Methods for estimating the expected distortion in ERRDO procedures are shown in [references 2-6]. The method proposed in [reference 2] is a multiple hypothetical decoder based scheme that simulates channel errors and emulates a decoding process within an encoder without actually decoding an entire bitstream. Each hypothetical decoder experiences a different random loss realization determined by the specified channel conditions. An average distortion over all the decoders is then used as an estimate of the expected distortion given the source and channel parameters, and is used in the rate distortion optimization framework.

The method proposed in [reference 3] and further enhanced in [reference 4], which is commonly referred to as ROPE (Recursive Optimal Per-pixel distortion Estimation), is a less memory intensive recursive scheme than the multiple decoder based scheme. In order to compute the expected distortion at a particular frame k, this method uses first and second moments of reconstructed pixel values at the decoder for frame k−1 (assuming frame k is dependent on frame k−1). The scheme can be extended to cases when multiple reference frames are used [see reference 5].

The method in [reference 6] assumes that integer pixel accuracy is used for motion estimation at the encoder, and that no in-loop filtering is performed. State-of-the-art video compression standards such as H.264/AVC [see reference 7] commonly use sub-pixel interpolation, in-loop filtering, bi-prediction, etc., where it is not optimal to assume integer pixel accuracy for motion estimation at the encoder.

When features with additional filtering over multiple reconstructed pixel samples are used, the decoded sample values after error concealment are also affected by the filtering, and this can be taken into account when estimating the distortion.

The present disclosure proposes an enhancement to this scheme that extends its applicability to cases when sub-pixel motion estimation, in-loop filtering, bi-prediction, etc., are used by the encoder such that the method in [reference 6] can also be used with in an error resilient rate distortion optimization framework.

Figure 2:
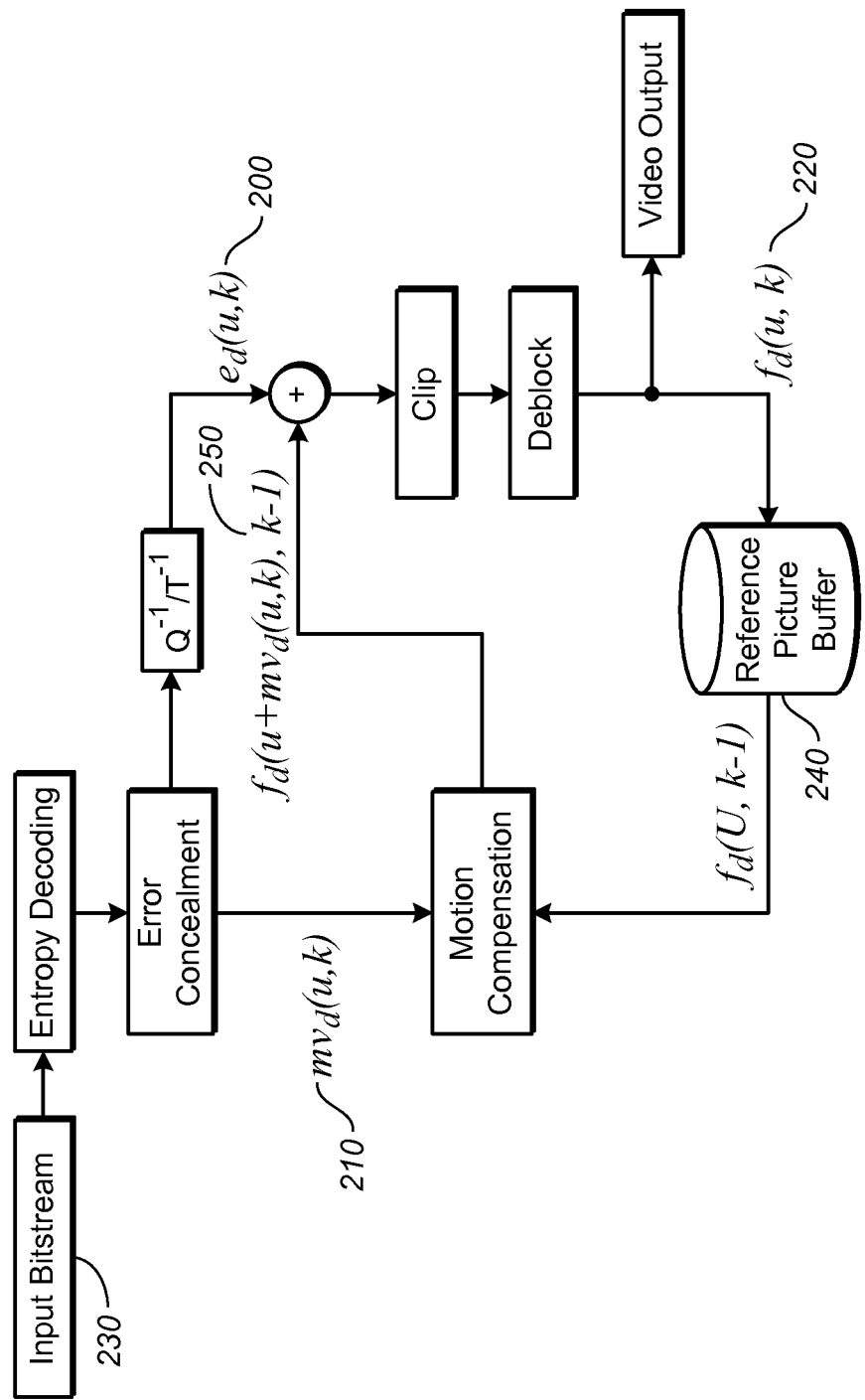
FIG. 2 shows a block diagram of a video decoder.

FIGS. 1-2 are high level diagrams of a video encoder and decoder architecture, respectively. In the encoder diagram shown in FIG. 1, the input sample values at spatial location u, and time k, are denoted f(u,k) (100). A prediction residual at the encoder after transform/quantization and inverse quantization/transform is denoted $e_c(u,k)$ (110). A prediction residual is a residual that is expected at the decoder, as predicted during an encoding stage. This residual is added to a temporal prediction, $f_c(u+mv(u,k), k-1)$ (120), where mv(u, k) denotes an estimated motion vector, and then clipped and filtered to obtain final reconstructed image samples at the encoder, denoted $f_c(u,k)$ (140). In a more general case, a temporal neighbor which is not necessarily a previous frame k−1, represented as j, may be used as a reference to generate the temporal prediction. Also shown in FIG. 1 is a rate distortion optimization block (160), which will be later discussed with reference to FIG. 3.

In the decoder diagram shown in FIG. 2, an input bitstream (230), which may contain random errors or packet losses, is received and entropy decoding is performed on the bitstream. An error correction step may also be performed prior to entropy decoding in order to recover from some losses in the channel. When such attempts to recover from losses in the channel are not sufficient with error correction, an error concealment step attempts to recover lost information (e.g., macroblock modes, motion vectors, residual information, etc.) from the bitstream. The error concealment corrects damaged pixels in a given frame using information obtained from other pixels from the same frame (intraframe error concealment) or a previous frame (interframe error concealment). The error concealment step may occur as a post-process after all correctly received portions of an image or region are decoded.

A concealed residual at the decoder is denoted $e_d(u,k)$ (200), and concealed motion vectors are denoted $mv_d(u,k)$ (210). Due to errors in the bitstream both of these values may differ from corresponding values computed at the encoder. The concealed motion vectors are combined with frame k, from a reference picture buffer (240) to create a temporal estimation, denoted as $f_d(u+mv_d(u,k), k-1)$ (250). The temporal estimation $f_d(u+mv_d(u,k), k-1)$ (250) is added to the concealed residual $e_d(u,k)$ (200), then clipped and filtered to obtain the final reconstructed samples at the decoder, denoted $f_d(u,k)$ (220).

Since distortion is a measure of quality of a sample at an output, given a particular input, the expected distortion of a pixel at position u in picture k, denoted by E[D(u,k)] can be computed as:

$$E[D(u,k)] = E[(f(u,k) - f_d(u,k))^2], \quad (2)$$

where the distortion is represented as a squared difference of the sample f(u,k) at an input of the encoder and the sample $f_d(u,k)$ at an output of the decoder. The above equation can be re-written as:

$$E[D(u,k)] = E[\{(f(u,k)) - (f_c(u,k)) + (f_c(u,k) - f_d(u,k))\}^2], \quad (3)$$

by adding and subtracting the term $f_c(u,k)$ to obtain a difference between the input and output of the encoder on a left hand side of equation (3), and a difference between the input and output of the decoder on the right hand side of the equation. The difference at the encoder can be re-written as a distortion of the encoder $D_c(u,k)$ and the difference at the decoder can be re-written as a distortion of the decoder $D_d(u, k)$, shown as:

$$E[D(u,k)] = E[(D_c(u,k) + D_d(u,k))^2], \quad (4)$$

By applying simple algebra to equation (4), we get:

$$E[D(u,k)] = [D_c(u,k)]^2 + D_c(u,k)E[D_d(u,k)] + E[(D_d(u,k))^2], \quad (5)$$

where $D_c(u,k)$ represents the distortion at the encoder (caused by quantization, clipping, etc.) and $D_d(u,k)$ represents the transmission distortion at the decoder (caused by channel errors, clipping, etc.). $D_c(u,k)$ is deterministic and is known at the encoder, thus the "expectation" is removed.

Based on equation (5), in order to compute the expected distortion, $E[D_d(u,k)]$ (first moment) and $E[(D_d(u,k))^2]$ (second moment) are first computed. Assuming that the pixel at location u of picture k, relies on picture j as a reference, $E[D_d(u,k)]$ and $E[(D_d(u,k))^2]$ can be computed as functions of the probability of loss of packets containing the residual and motion vector information related to the pixel at position u, and $E[D_d(u+mv_d(u,k),j)]$, $E[D_d(u+mv(u,k),j)]$, $E[(D_d(u+mv_d(u,k),j))^2]$, and $E[(D_d(u+mv(u,k),j))^2]$.

Basis for such an assumption is provided by FIG. 2, from where it can be seen that the amount of temporal estimation provided during error concealment is a measure of distortion at the decoder. In particular, a location $(u+mv_d(u,k),j)$ represents the location of a pixel in the decoder reconstructed picture j that would be used to conceal the pixel at location u in picture k, with error concealment if the corresponding packet is lost. Similarly, $(u+mv(u,k),j)$ represents a location of the pixel in the decoder reconstructed picture j that would be used to predict the pixel at location u in picture k, if the corresponding packet is received.

Since picture j is used as a reference for picture k, error resilient rate distortion optimization has already been performed on picture j, and then encoded. Thus, in the event that the motion vectors $mv(u,k)$ and $mv_d(u,k)$ refer to integer pixel locations, values for $E[D_d(u+mv_d(u,k),j)]$, $E[D_d(u+mv(u,k),j)]$, $E[(D_d(u+mv_d(u,k),j))^2]$, and $E[(D_d(u+mv(u,k),j))^2]$ would have been already computed during the error resilient rate distortion optimization of picture j. Therefore, the resulting values of $E[D_d(u+mv_d(u,k),j)]$, $E[D_d(u+mv(u,k),j)]$, $E[(D_d(u+mv_d(u,k),j))^2]$, and $E[(D_d(u+mv(u,k),j))^2]$ can be stored and read from memory.

In advanced video codecs, however, $mv(u,k)$ and $mv_d(u,k)$ may refer to sub-pixel locations, and then, the above values are generally re-computed during the rate distortion optimization of picture k based on available information from integer pixel locations of picture j. Computations of the first moments, $E[D_d(u+mv_d(u,k),j)]$ and $E[D_d(u+mv(u,k),j)]$, are relatively straightforward even for sub-pixel motion vectors. The computation of the second moments (the squared values), however, can be more complex. The present disclosure describes a method of using a low complexity approach for the computation of the second moments in the sub-pixel case.

It can be assumed that an interpolation used to generate a pixel at sub-pixel position u comprises an N tap finite impulse response (FIR) filter applied on pixels at integer pixel locations $u_i$ (i=0, ..., N−1) in picture j. For each location $u_i$, a weight $w_i$ is applied. Therefore, the second moment of the expected distortion after motion compensation can be written as:

$$E[(D_d(u,j))^2] = E\left[\left(\sum_{i=0}^{N-1} (w_i D_d(u_i,j))\right)^2\right], \quad (6a)$$

where, $w_i$ represents the filter tap at pixel location $u_i$. Writing equation (6) as:

$$E[X^2] = E\left[\left(\sum_{i=0}^{N-1} (w_i X_i)\right)^2\right], \quad (6b)$$

and assuming that $$\sum_{i=0}^{N-1} w_i = 1,$$

the following expression is obtained:

$$E[X^2] = \sum_{i=0}^{N-1} w_i E[(X_i)^2] - \sum_{i=0}^{N-2}\sum_{j=i+1}^{N-1} (w_i w_j E[(X_i - X_j)^2]), \quad (7)$$

According to one embodiment of the present disclosure, it can be assumed that since i and j represent pixel locations that are extremely close, the distortions represented by $X_i$ and $X_j$ are highly correlated. Therefore, the second term on the right hand side of equation (7) is negligible. This allows the computation of the second moment to be performed with the same complexity as that of the first moment such that:

$$E[X^2] \approx \sum_{i=0}^{N-1} w_i E[(X_i)^2], \quad (8)$$

According to another embodiment, the term $E[(X_i - X_j)^2]$ may be modeled as a function (for example a linear function or an exponential function) of the distance between pixel locations i and j, thereby allowing a low complexity estimate of such term.

In another embodiment, the term may be calculated accurately, once for each sub-pixel, and then stored in memory. Each time a macroblock from the same frame is used as a reference in a future frame, the calculated value stored in memory can be used for the expected distortion computation, thereby reducing the computational complexity of future frames. Thus, although a complex calculation is performed once, future calculations are simplified.

Figure 3:
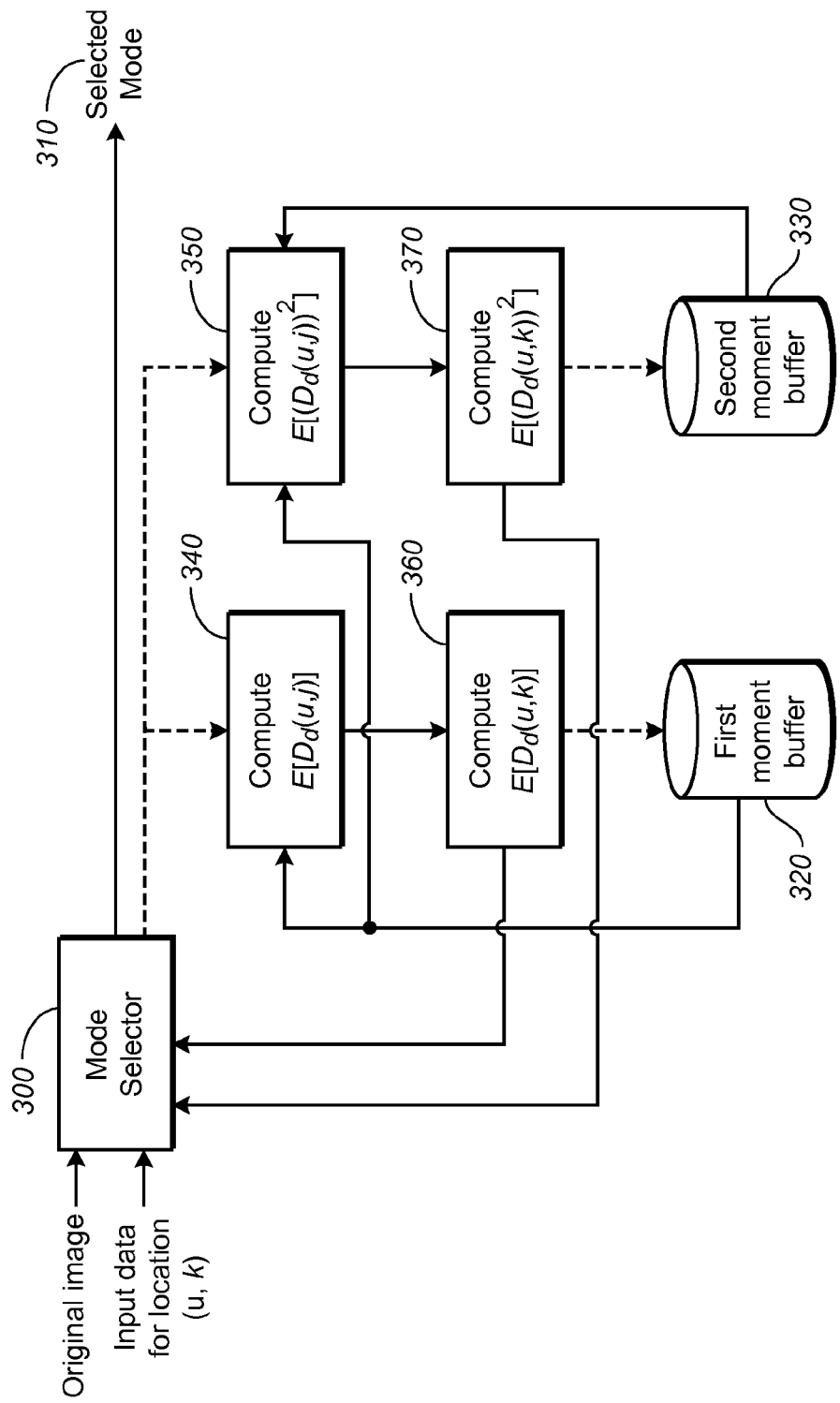
FIG. 3 shows a block diagram of a rate distortion optimization system using analytical computation of first and second order moments of transmission distortion.

A block diagram as shown in FIG. 3 illustrates a manner in which the method described above can be used within an ERRDO framework, where the entire process illustrated can occur for example, within the rate distortion optimization block (160) of the encoder in FIG. 1. In FIG. 3, the mode selector block (300) tests every possible encoding mode (such as inter-coding, intra-coding, various block sizes/shapes for motion estimation, and so on). For each mode, computation blocks (340, 350, 360, 370) compute the first and second moments of the transmission distortion for picture j (i.e., the corresponding reference picture for the selected mode) and the mode selector block (300) use those computed values of the first and second moments of the transmission distortion to obtain estimated distortion for the current picture. For each mode, an estimated bit rate is also computed. The desired mode is then selected by the mode selector block (300), for example, by using a method such as that shown in equation (1), and then used for encoding by sending estimated motion parameters of the selected mode from the mode selector block (300) to the motion estimation unit (170) and the motion compensation unit (180) of FIG. 1. The computed first and second moments of the distortion for the selected mode are also stored in the first moment buffer (320) and the second moment buffers (330) for use in the encoding of subsequent pictures. Modes which are not selected are discarded.

According to further embodiments of the present disclosure, equation (7) can also be applied in cases other than sub-pixel interpolation, such as, for example, weighted prediction or weighted deblocking, to determine expected distortion of a linearly filtered sample based on the expected distortion of samples used for filtering. In general, equation (7) and its simplifications described above can also be used in other applications that could benefit from simplified computation of a second moment of a random variable that is a weighted sum of a set of random variables.

In conclusion, embodiments of the present disclosure extend an existing method (equation 6) for estimating the transmission distortion of video into a form (equation 7) that can be used with an error resilient mode decision process. These embodiments also improve applicability of distortion estimation algorithm to state-of-the-art video coding standards.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

The examples set forth above are provided to give those of ordinary skill in the art a complete disclosure and description of how to make and use the embodiments of the methods and systems for ERRDO for image and video encoding of the disclosure, and are not intended to limit the scope of what the inventors regard as their disclosure. Modifications of the above-described modes for carrying out the disclosure may be used by persons of skill in the art, and are intended to be within the scope of the following claims. As described herein, an embodiment of the present invention may relate to one or more of the example embodiments that are enumerated in Table 1, below.

TABLE 1

ENUMERATED EXAMPLE EMBODIMENTS

| | |
|---|---|
| EEE1. | A method for distortion optimization of image or video data, comprising: providing a coded image or video data; evaluating distortion of the coded image or video data as a function of transmission distortion of the image or video data; and performing distortion optimization of the image or video data while encoding the image or video data. |
| EEE2. | The method of Enumerated Example Embodiment 1, wherein the transmission distortion of the image or video data is a difference between an input image or video data before encoding and a corresponding output image or video data after decoding. |
| EEE3. | The method of Enumerated Example Embodiment 2, wherein the input image or video data before encoding is a known value. |
| EEE4. | The method of Enumerated Example Embodiment 2, wherein the output image or video data after decoding is an unknown random variable. |
| EEE5. | The method of any one of Enumerated Example Embodiments 1 or 2, wherein the transmission distortion is a function of channel losses. |
| EEE6. | The method of any one of the previous Enumerated Example Embodiments 1-5, wherein the evaluating the distortion comprises evaluating the distortion in terms of a linear term and a quadratic term, each of the linear term and the quadratic term expressing the transmission distortion of the image or video data. |
| EEE7. | The method of Enumerated Example Embodiment 6, wherein the evaluating the distortion comprises computing a distortion expected at the decoder. |
| EEE8. | The method of Enumerated Example Embodiment 7, wherein the computing the distortion expected at the decoder comprises computing a first moment of the transmission distortion. |
| EEE9. | The method of Enumerated Example Embodiment 7, wherein the computing the distortion expected at the decoder comprises computing a second moment of the transmission distortion. |
| EEE10. | The method of any one of the previous Enumerated Example Embodiments, wherein the distortion optimization is performed through motion vectors during an error concealment step. |
| EEE11. | The method of Enumerated Example Embodiment 10, wherein the motion vectors refer to integer pixel locations. |
| EEE12. | The method of Enumerated Example Embodiment 10, wherein the motion vectors refer to sub-pixel locations. |
| EEE13. | The method of Enumerated Example Embodiment 12, wherein the sub-pixel locations are generated through a filter applied to integer pixel locations. |
| EEE14. | The method of Enumerated Example Embodiment 13, wherein the filter is a finite impulse response (FIR) filter. |
| EEE15. | The method of any one of Enumerated Example Embodiments 13 or 14, wherein, when evaluating the quadratic term, distortions between close pixel locations are assumed to be the same. |
| EEE16. | The method of any one of Enumerated Example Embodiments 13 or 14, wherein, when evaluating the quadratic term, an estimate of a squared difference of distortions between close pixel locations is modeled as a function. |
| EEE17. | The method of Enumerated Example Embodiment 16, wherein the function is a linear or exponential function. |
| EEE18. | The method of any one of Enumerated Example Embodiments 13 or 14, wherein, when evaluating the quadratic term, an estimate of a squared difference of distortions between close pixel locations is computed. |

TABLE 1-continued

ENUMERATED EXAMPLE EMBODIMENTS

EEE19. The method of Enumerated Example Embodiment 18, wherein the computed estimate is stored in memory.

EEE20. The method of any one of Enumerated Example Embodiments 15-19, wherein the distortions are determined by weighted prediction.

EEE21. The method of any one of Enumerated Example Embodiments 15-19, wherein the distortions are determined by weighted deblocking.

EEE22. The method of any one of Enumerated Example Embodiments 1-21, wherein the distortion optimization occurs in a rate distortion optimization block of an encoder.

EEE23. An encoder adapted to receive an image or video data, the encoder comprising:
an input for receiving the image or video data;
a reference picture buffer unit, the reference picture buffer unit containing stored image or video data;
a rate distortion optimization unit, the rate distortion optimization unit adapted to receive the image or video data from the input;
a motion estimation unit, the motion estimation unit adapted to receive the image or video data from the input and the rate distortion optimization unit, and adapted to receive stored image or video data from the reference picture buffer unit;
a motion compensation unit, the motion compensation unit adapted to receive the image or video data from the motion estimation unit and the stored image or video data from the reference picture buffer unit;
a transforming unit; and
a quantizing unit, the quantizing unit and the transforming unit adapted to receive a combined image or video data from the input and the motion compensation unit.

EEE24. The encoder of Enumerated Example Embodiment 23, wherein the rate distortion optimization unit is adapted to receive feedback from the motion compensation unit.

EEE25. The encoder of any one of Enumerated Example Embodiments 23-24, wherein the rate distortion optimization unit further comprises:
a first moment of transmission distortion computation unit;
a first moment of transmission distortion buffer unit, the first moment of transmission buffer unit adapted to receive a computed first moment of transmission distortion value from the first moment of transmission distortion computation unit;
a second moment of transmission distortion computation unit;
a second moment of transmission distortion buffer unit, the second moment of transmission distortion buffer unit adapted to receive a computed second moment of transmission distortion value from the second moment of transmission distortion computation unit; and
a mode selector unit, the mode selector unit adapted to receive the computed first and second moment of transmission distortion value, the image or video data input, and the feedback from the motion compensation unit.

EEE26. The encoder of Enumerated Example Embodiment 25, further comprising two first moment of transmission distortion computation units and two second moment of transmission distortion computation units.

EEE27. The encoder of any one of Enumerated Example Embodiments 25-26, wherein the first moment of transmission distortion computation units and the second moment transmission distortion computation units are adapted to perform computation according to the method of any one of Enumerated Example Embodiments 15-18.

EEE28. The encoder of any one of Enumerated Example Embodiments 25-27, wherein the mode selector unit is adapted to test and select encoding modes selected from the group consisting of: inter-coding, intra-coding, and various sizes/shapes for motion estimation.

EEE29. The encoder of any one of Enumerated Example Embodiments 23-28, wherein the rate distortion optimization unit is adapted to reduce transmission distortion at a decoder.

EEE30. The encoder of any one of Enumerated Example Embodiments 23-28, wherein the encoder is adapted to reduce transmission distortion at a decoder.

EEE31. An encoder for encoding an image or video signal according to the method recited in one or more of Enumerated Example Embodiments 1-30.

EEE32. An apparatus for encoding an image or video signal according to the method recited in one or more of Enumerated Example Embodiments 1-30.

EEE33. A system for encoding an image or video signal according to the method recited in one or more of Enumerated Example Embodiments 1-30.

EEE34. A computer-readable medium containing a set of instructions that causes a computer to perform the method recited in one or more of Enumerated Example Embodiments 1-33.

EEE35. Use of the method recited in one or more of Enumerated Example Embodiments 1-34 to encode an image or video signal.

Note:

as used in Table 1, all number series are inclusive lists. Moreover, as used in a denotive context within Table 1, the terms "is" and "are" may respectively correspond to the meanings --comprises-- and --comprise.-- Accordingly, the invention may be embodied in any of the forms described herein, including, but not limited to the following Enumerated Example Embodiments (EEEs) which described structure, features, and functionality of some portions of the present invention:

Furthermore, all patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] T. Stockhammer, M. M. Hannuksela, and T. Wiegand, "H.264/AVC in Wireless Environments," IEEE Trans. on Circuits and Systems for Video Technology, vol. 13, no. 7, pp. 657-673, July 2003.
[2] T. Stockhammer, T. Wiegand, and S. Wenger, "Optimized Transmission of H.26L/JVT Coded Video Over Packet-Lossy Networks," Proc. of the International Conference on Image Processing (ICIP), 2002.
[3] R. Zhang, S. L. Regunathan, and K. Rose, "Video Coding with Optimal Intra/Inter-Mode Switching for Packet Loss Resilience," IEEE Journal on Selected Areas in Communications, vol. 18, no 6, pp. 966-976, June 2000.
[4] H. Yang, and K. Rose, "Advances in Recursive Per-Pixel End-to-End Distortion Estimation for Robust Video Coding in H.264/AVC," IEEE Trans. on Circuits and Systems for Video Technology, vol. 17, no. 7, pp. 845-856, July 2007.
[5] A. Leontaris, and P. C. Cosman, "Video Compression for Lossy Packet Networks with Mode Switching and a Dual-Frame Buffer," IEEE Trans. on Image Processing, vol. 13, no. 7, pp. 885-897, July 2004.
[6] Z. Chen, D. Wu, "Study of video distortion for real-time video transmission over wireless channels," Proceedings of SPIE Defense & Security Symposium 2009, Orlando, Fla., USA, Apr. 13-17, 2009.
[7] Advanced video coding for generic audiovisual services, http://www.itu.int/rec/recommendation.asp?type=folders&lang=e&parent=T-REC-H.264, March 2009.

What is claimed is:

1. A method for distortion optimization of image or video data, comprising:
providing a coded image or video data;
evaluating distortion of the coded image or video data as a function of transmission distortion of the image or video data;
and
performing distortion optimization of the image or video data while encoding the image or video data, wherein the distortion relates to a pixel distortion after motion compensation, and
evaluating the distortion includes calculating an approximated second moment of said distortion based on the following equation:

$$E[X^2] \approx \sum_{i=0}^{N-1} w_i E[(x_i)^2]$$

wherein:
$X = D_d(u,j)$ denotes a distortion related to a decoder side and being dependent on a pixel position u and a picture index j;
w denotes a weight parameter wherein $$\sum_{i=0}^{N-1} w_i = 1,$$

and
N denotes an integer number of pixel locations.

2. The method as recited in claim 1, wherein the transmission distortion of the image or video data is a difference between an input image or video data before encoding and a corresponding output image or video data after decoding.

3. The method as recited in claim 2, wherein the input image or video data before encoding comprises a known value.

4. The method as recited in claim 2, wherein the output image or video data after decoding comprises an unknown random variable.

5. The method as recited in claim 2, wherein the transmission distortion comprises a function of channel losses.

6. The method as recited in claim 5, wherein the distortion evaluation comprises evaluating the distortion in terms of a linear term and a quadratic term, each of the linear term and the quadratic term expressing the transmission distortion of the image or video data.

7. The method as recited in claim 6, wherein the evaluating the distortion comprises computing a distortion expected at the decoder.

8. The method as recited in claim 7, wherein the distortion optimization is performed through motion vectors during an error concealment step.

9. An encoder adapted to receive an image or video data, the encoder comprising:
an input for receiving the image or video data;
a reference picture buffer unit, the reference picture buffer unit containing stored image or video data;
a rate distortion optimization unit, the rate distortion optimization unit adapted to receive the image or video data from the input, wherein the rate distortion optimization unit is further adapted to evaluate a distortion and to calculate an approximated second moment of said distortion based on the following equation, the distortion related to a pixel distortion after motion compensation:

$$E[X^2] \approx \sum_{i=0}^{N-1} w_i E[(X_i)^2]$$

wherein:
$X = D_d(u,j)$ denotes a distortion related to a decoder side and being dependent on a pixel position u and a picture index j;

w denotes a weight parameter wherein $$\sum_{i=0}^{N-1} w_i = 1,$$

and

N denotes an integer number of pixel locations;

a motion estimation unit, the motion estimation unit adapted to receive the image or video data from the input and the rate distortion optimization unit, and adapted to receive stored image or video data from the reference picture buffer unit;

a motion compensation unit, the motion compensation unit adapted to receive the image or video data from the motion estimation unit and the stored image or video data from the reference picture buffer unit;

a transforming unit; and a quantizing unit, the quantizing unit and the transforming unit adapted to receive a combined image or video data from the input and the motion compensation unit.

10. The encoder as recited in claim 9, wherein the rate distortion optimization unit is adapted to receive feedback from the motion compensation unit.

11. The encoder as recited in claim 10, wherein the rate distortion optimization unit further comprises:

a first moment of transmission distortion computation unit;

a first moment of transmission distortion buffer unit, the first moment of transmission buffer unit adapted to receive a computed first moment of transmission distortion value from the first moment of transmission distortion computation unit;

a second moment of transmission distortion computation unit;

a second moment of transmission distortion buffer unit, the second moment of transmission distortion buffer unit adapted to receive a computed second moment of transmission distortion value from the second moment of transmission distortion computation unit; and a mode selector unit, the mode selector unit adapted to receive the computed first and second moment of transmission distortion value, the image or video data input, and the feedback from the motion compensation unit.

12. The encoder as recited in claim 11, wherein one or more of encoder or the rate distortion optimization unit thereof is adapted to reduce transmission distortion at a decoder.

13. An apparatus for encoding an image or video signal according to a method as recited in claim 8.

14. A system for encoding an image or video signal according to the method as recited in claim 1.

15. A non-transitory computer readable storage medium containing a set of instructions that causes a computer to perform a method as recited in claim 1.

* * * * *